(12) United States Patent
Borkovsky

(10) Patent No.: US 6,556,991 B1
(45) Date of Patent: Apr. 29, 2003

(54) ITEM NAME NORMALIZATION

(75) Inventor: Arkady Borkovsky, San Francisco, CA (US)

(73) Assignee: e-Centives, Inc., Bethesda, MD (US)

( * ) Notice: Subject to any disclaimer, the term of this patent is extended or adjusted under 35 U.S.C. 154(b) by 272 days.

(21) Appl. No.: 09/653,040

(22) Filed: Sep. 1, 2000

(51) Int. Cl.$^7$ .............................................. G06F 17/30
(52) U.S. Cl. ................................................ 707/6; 707/3
(58) Field of Search ................................ 707/2, 3, 5, 6, 707/101

(56) References Cited

U.S. PATENT DOCUMENTS

| | | | | |
|---|---|---|---|---|
| 5,333,317 A | * | 7/1994 | Dann | 707/5 |
| 5,781,772 A | * | 7/1998 | Wilkinson et al. | 370/229 |
| 5,826,263 A | * | 10/1998 | Nakabayashi et al. | 707/104.1 |
| 5,960,430 A | * | 9/1999 | Haimowitz et al. | 707/1 |

* cited by examiner

Primary Examiner—Diane D. Mizrahi

(57) ABSTRACT

A computer-implemented approach for processing search queries generally involves normalizing names and descriptions of items. The various forms of a name or description of an item is referred to as an item name variant. The normalized form of the name or description of an item is referred to as a normalized item name. Item name variants that are similar are grouped together to form clusters. Each cluster of item name variants is mapped to a normalized item name. A dictionary of normalized item names are created by storing: 1) the item name variant, 2) the information that is obtained from the item name source and which is associated with the item name variant, and 3) the mapping information that maps the item name variant to the corresponding normalized item name.

20 Claims, 9 Drawing Sheets

ITEM NAME NORMALIZATION

FIELD OF THE INVENTION

The present invention relates to query processing, and more specifically, to an item name normalization approach for processing queries.

BACKGROUND OF THE INVENTION

Information is typically retrieved from an information system by submitting a search query to the information system, where the search query specifies a set of search criteria. The information system processes the search query against a set of searchable items and provides search results to a user. For example, in the context of online shopping over the Internet, a user may submit a word-based search query that specifies the type of item and the brand name of the item that the user wishes to purchase. As used herein, the term "item name" refers to information used to identify an item. Thus, "item name" may, for example, refer to the brand name of an item, the model name of the item, or a short description of the item, which may include the brand name of the item. For example, a user that is shopping for a winter-camping sleeping bag may submit a word-based search query that specifies, "Lands' End sub-zero sleeping bag". Thus, "Lands' End sub-zero sleeping bag" is an item name that describes the type of item (i.e. "sleeping bag"), a subclass of that item (i.e. "sub-zero"), and the brand name of the item (i.e. "Lands' End") that the user is interested in purchasing.

As used herein, the term "search results" refers to data that indicates the item names that satisfy a search query. One problem with using word-based search queries to retrieve information is that word-based search queries sometimes do not accurately reflect the intent of the user, and thus the user is often dissatisfied with the search results. For example, assume that "Lands'End sub-zero sleeping bag " is a valid item name. Further assume that a user who is interested in purchasing a sub-zero sleeping bag made by Lands'End may submit a search query that does not exactly match the item name "Lands'End sub-zero sleeping bag". Instead the user submits a query such as "Landsend Company sub-zero sleeping bag". The search results for such a query may be a null set because no item names match the search query "Landsend Company sub-zero sleeping bag".

Another problem may be that the various sources from which item names are extracted may themselves provide inconsistent information on item names. Also, such sources may provide different information on prices and other product information associated with the item names. The following example illustrates the problem of inconsistent item names as well as the problem of different information associated with the item names in the context of online catalog shopping.

FIG. 1A is a table 100 that shows brand names 101, 103, 105, 107 and 109. Brand names 101, 103, 105, 107 and 109 are really variations of the brand name, "Lands'End". Similarly, FIG. 1B is a table 110 that shows item names 112, 114, 116, 118 and item name sources, 112a, 114a, 116a, 118a. Item names 112, 114, 116 and 118 are variations of the same item name. Variations of an item name will henceforth be referred to as "item name variants". Assume that each item name variant in table 110 is extracted from a different shopping catalog. For example, item name variant 112 is extracted from item name source 112a, namely, "Catalog A". Similarly, item name variants 114, 116, 118 are extracted from item name sources 114a, 116a, 118a respectively. Further assume that each item name source provides different information on the item name variants. For example, assume that item name source 112a indicates that item name variant 112 is priced at $10 and available in red, blue, green and yellow; item name source 114a indicates that item name variant 114 is priced at $11 and available in green and yellow only; item name source 116a indicates that item name variant 116 is priced at $9 and available in yellow only; and item name source 118a indicates that item name variant 118 is priced at $15 and available in 36 colors.

If, for example, a user submits a search query, "Landsend Company sweater for girls", only item name variant 114 would satisfy the search query. Thus the user may believe that only green and yellow sweaters are available and that are priced at $11. The user may in fact be cost conscious and thus may prefer the $9 sweater described by item name source 116a. Alternatively, the user may be more concerned with having a range of colors from which to select and thus would probably prefer the information from item name source 118a, which indicates that the sweater is available in 36 colors.

Given the current demand for query processing in the context of online shopping and the limitations in the prior approaches, an approach for processing queries that does not suffer from limitations associated with conventional query processing approaches is highly desirable. In particular, an approach for processing queries that addresses the problem of multiple variants of an item name and the inconsistent information associated with an item name is highly desirable.

SUMMARY OF THE INVENTION

According to one aspect of the invention, a method is provided for normalizing item names. One or more clusters of item name variants are determined, wherein the item name variants are extracted from an initial set of documents and wherein each cluster of item name variants is a cluster of similar item name variants. A normalized item name that is logically associated with each cluster is determined. The item name variants in each cluster is mapped to create an initial set of mapping information. A dictionary is created using the mapping information.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, specific details are set forth in order to provide a thorough understanding of the invention. However, it will be apparent that the invention may be practiced without these specific details. In other instances, well-known structures and devices are depicted in block diagram form in order to avoid unnecessarily obscuring the invention.

Various aspects and features of example embodiments of the invention are described in more detail hereinafter in the following sections: (1) functional overview; (2) dictionary of normalized item names; (3) interactive mode; (4) implementation mechanisms.

1. FUNCTIONAL OVERVIEW

In order to address the failure of recognition of item name variants and the failure to retrieve the complete set of information that is associated with the item name variants, according to one embodiment of the invention, a mechanism is provided to build a dictionary of item name variants mapped to corresponding normalized item names.

According to an embodiment of the invention, a mechanism is provided to determine a normalized item name for each item name variant that is extracted from records provided by various item name sources. Each item name variant is then mapped to its associated normalized item name. Thus, one or more item name variants may be mapped to a single normalized item name.

The mechanism creates a dictionary of normalized item names by storing 1) the item name variant, 2) the information that is obtained from the item name source and which is associated with the item name variant, and 3) the mapping information that maps the item name variant to the corresponding normalized item name. Thus, when a user submits a search query that includes any one of the variant item names, the mechanism automatically uses the stored mapping information to retrieve all the available product information associated with the corresponding normalized item name.

The creation of the dictionary of normalized item names is described in greater detail below in the subsection entitled, "DICTIONARY OF NORMALIZED ITEM NAMES".

In one embodiment of the invention, as new item name sources become available, the mechanism normalizes any new variant item name that is extracted from new item name sources and stores 1) the item name variant, 2) the information that is obtained from the new item name source and which is associated with the item name variant, and 3) the mapping information that maps the item name variant to the corresponding normalized item name. The normalization of new variant item names may involve human interaction, which is further described below in the subsection entitled, "INTERACTIVE MODE".

2. DICTIONARY OF NORMALIZED ITEM NAMES

Figure 1A:
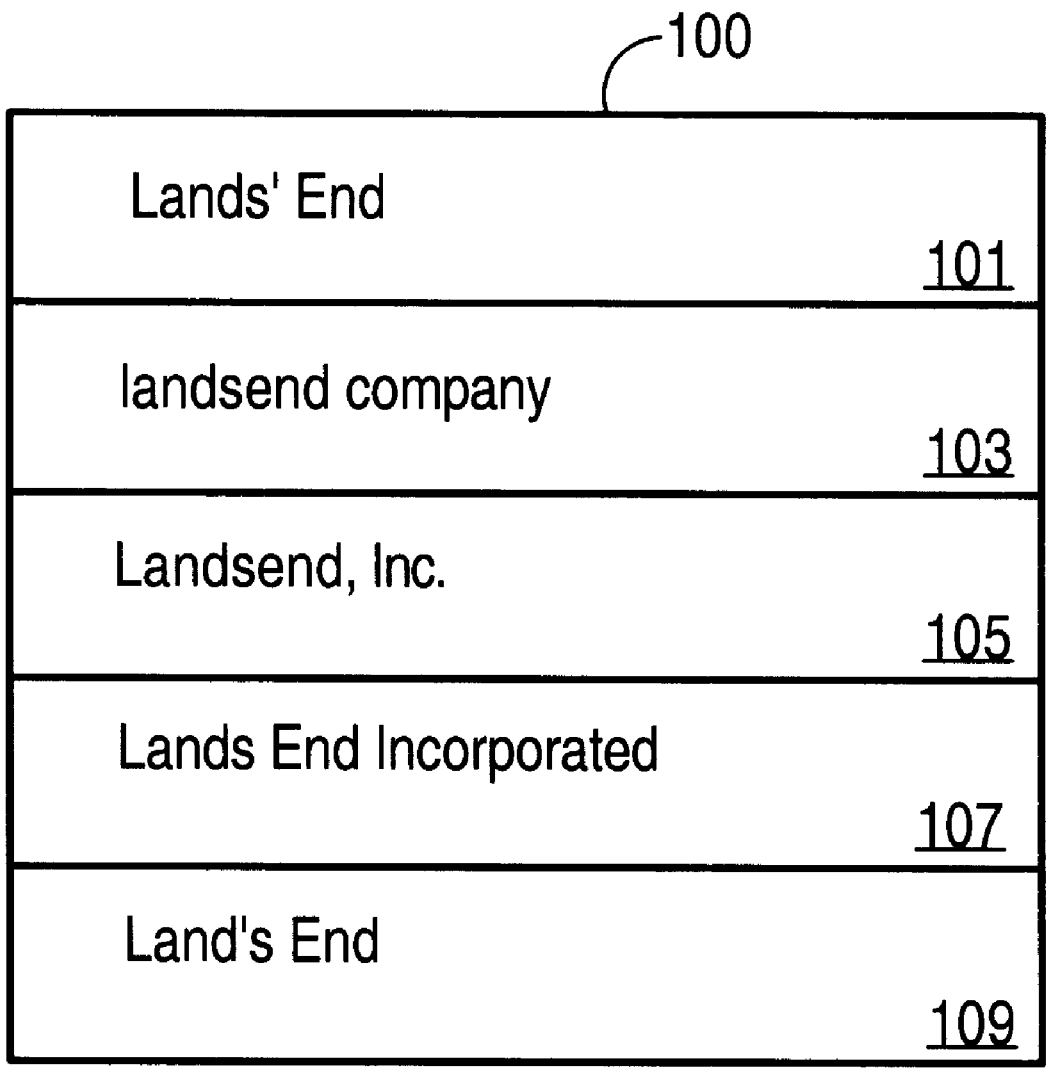
FIG. 1A is a table depicting several variants of a brand name.
Figure 1B:
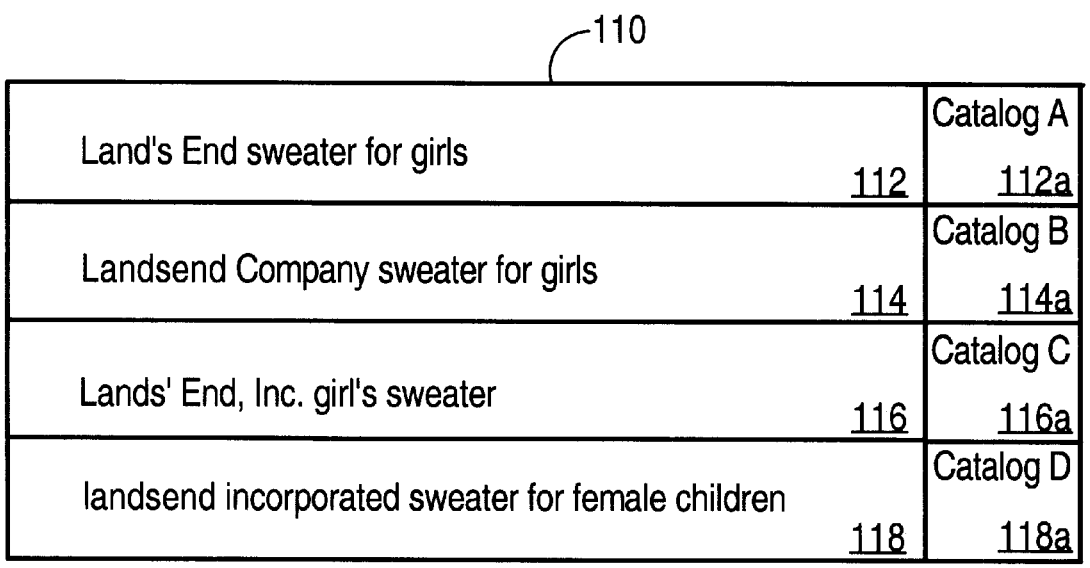
FIG. 1B is a table depicting several variants of an item name.
Figure 2:
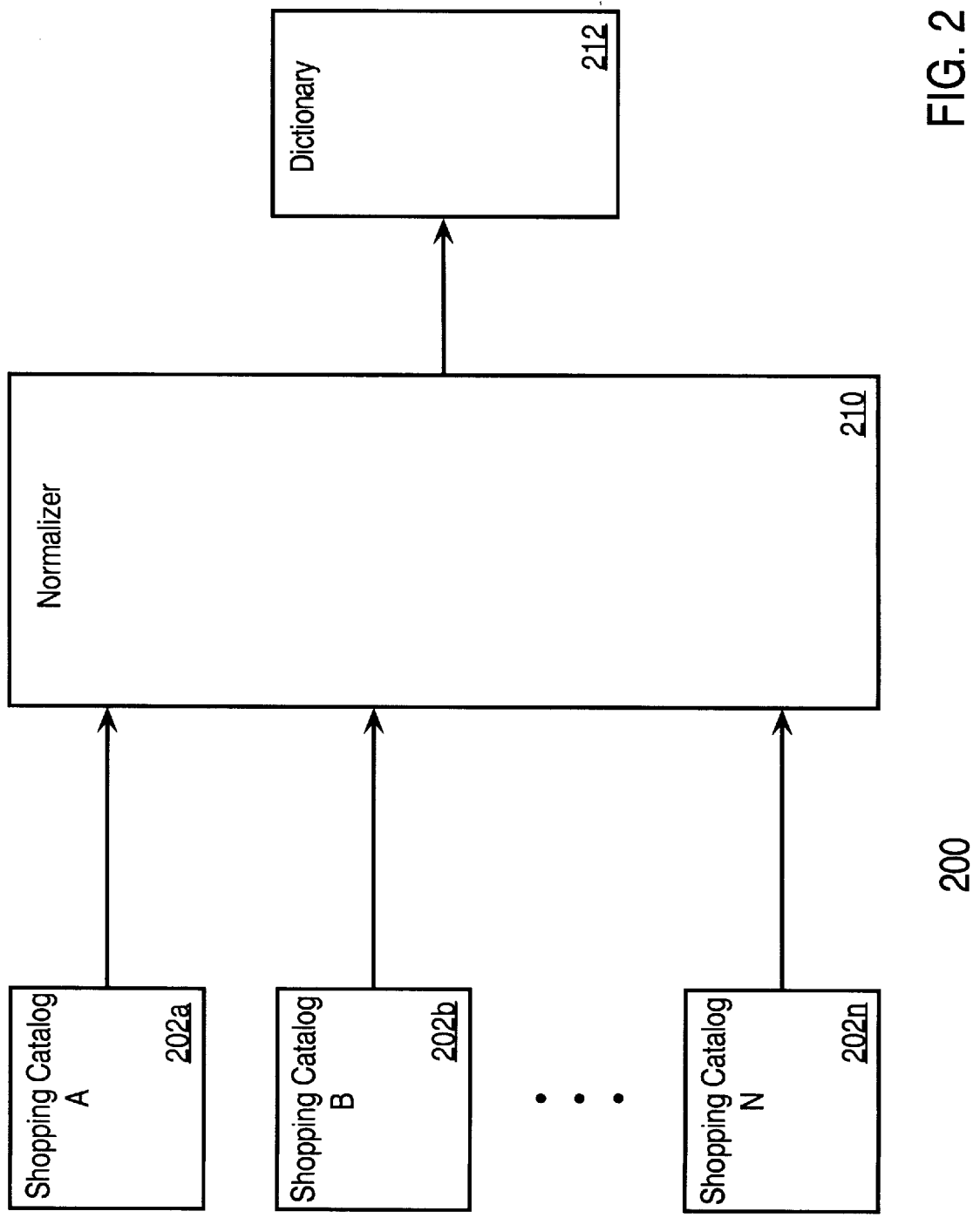
FIG. 2 is a block diagram that illustrates a system for building a dictionary of normalized item names.

FIG. 2 is block diagram that illustrates a system 200 used for building a dictionary 212 of normalized item names. System 200 has several item name sources 202a–n, a normalizer 210, and the dictionary 212 of normalized item names. For illustrative purposes, item name sources 202a–n may be shopping catalogs A to N respectively.

In one embodiment of the invention, a baseline dictionary of normalized item names is built using item names from as many item name sources as possible. As new item name sources are discovered, any information from the new item name sources is added to the baseline dictionary if it is determined that the information is not already in the baseline dictionary.

Figure 3A:
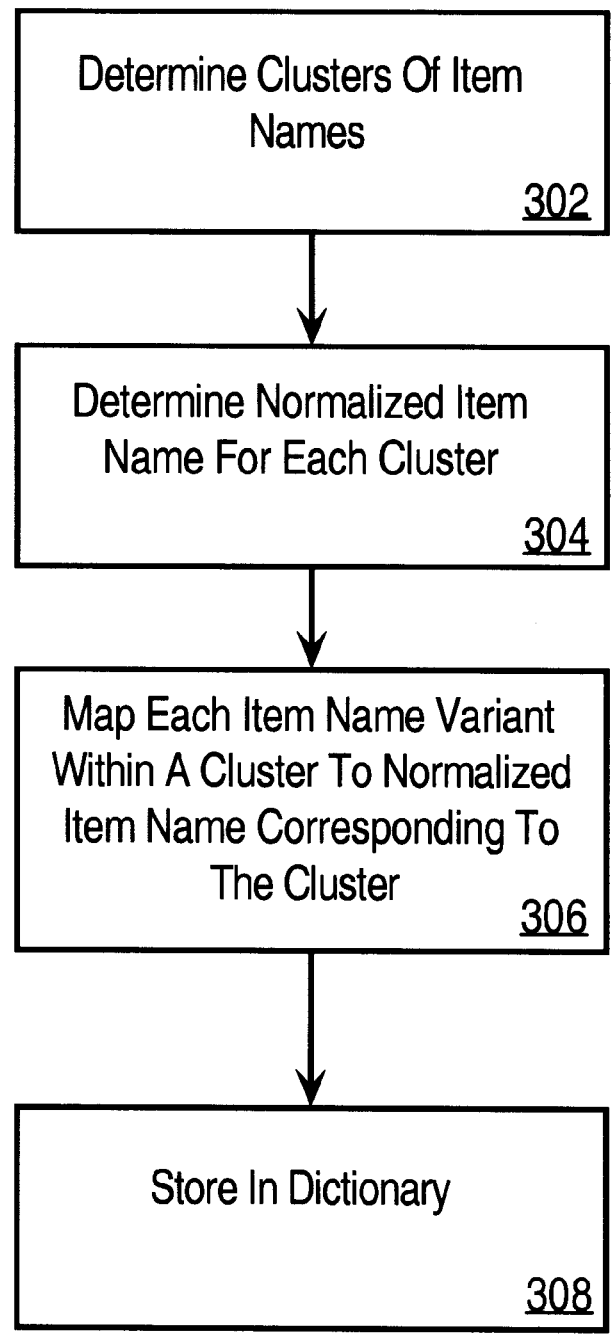
FIG. 3A is a block diagram that illustrates the normalization of input item name variants.
Figure 3B:
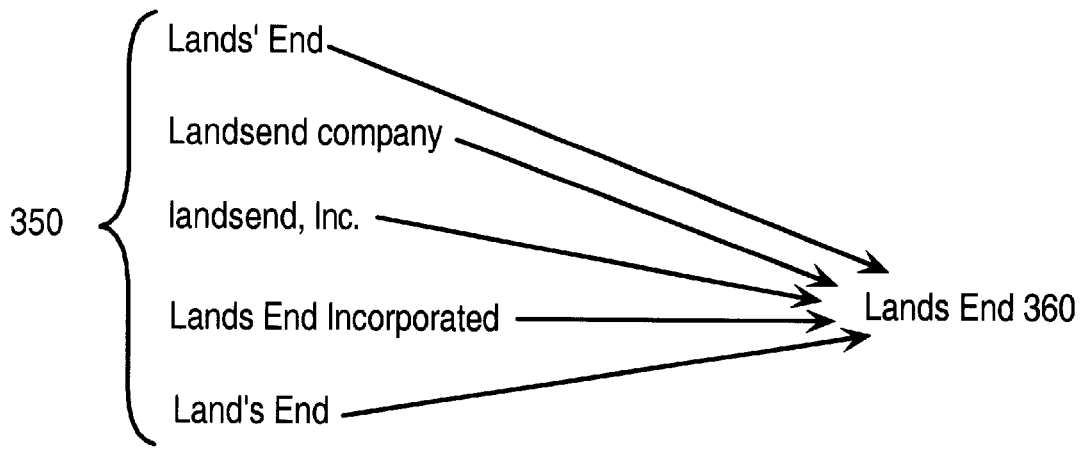
FIG. 3B is depicts clusters of item name variants.
Figure 3B:
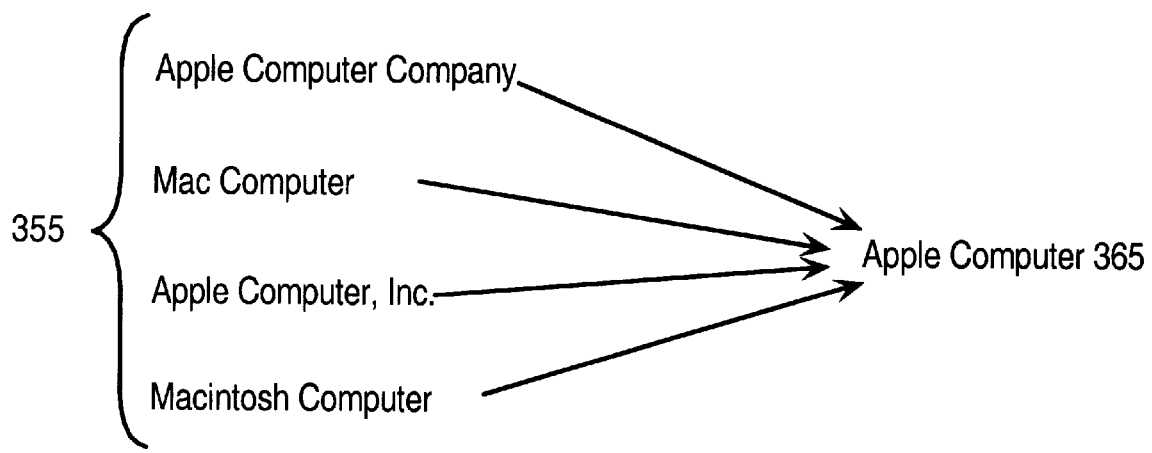
Figure 3C:
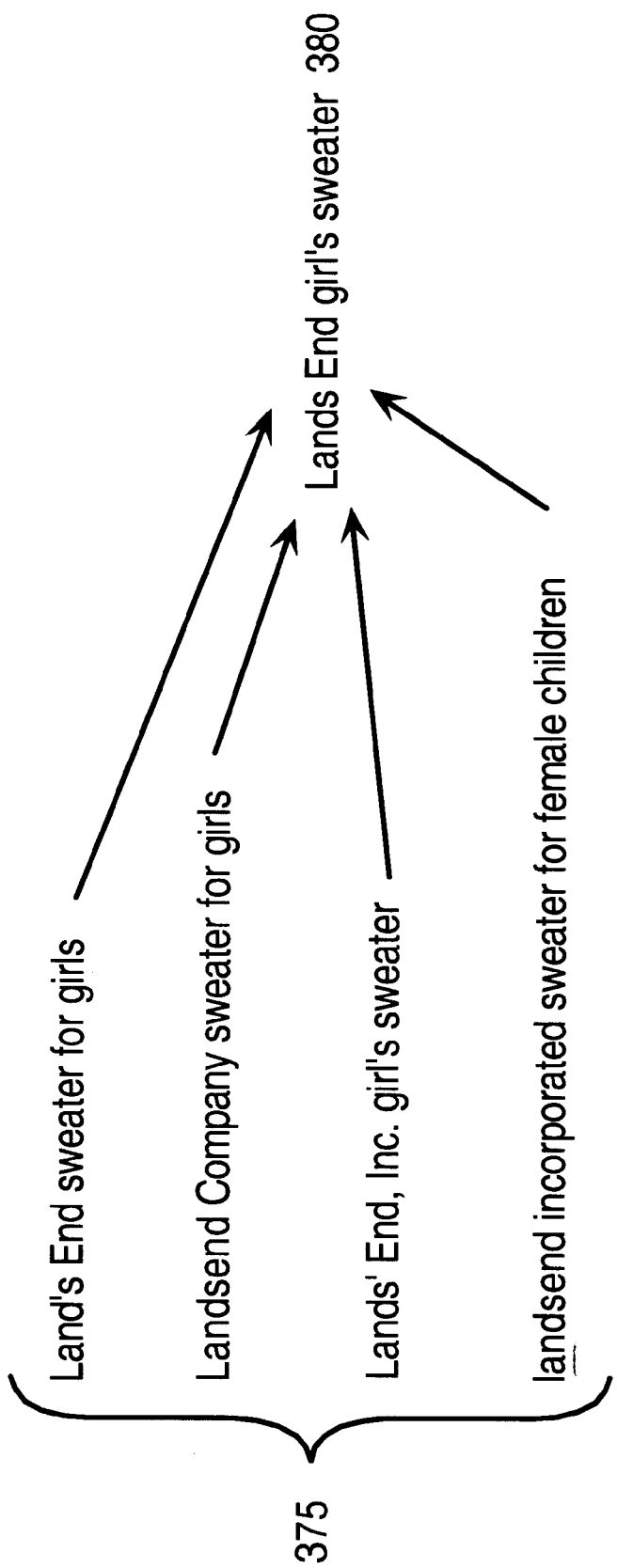
FIG. 3C shows a cluster of item name variants.

To illustrate a method for creating a baseline dictionary, assume that the item names contained in item name sources 202a–n (shopping catalogs A–N) are extracted and sent as "input" to normalizer 210. Normalizer 210 normalizes the input and produces "output". The output is stored in dictionary 212. The normalization of the input is further described in conjunction with the description of FIG. 3A, FIG. 3B and FIG. 3C. FIG. 3A, FIG. 3B and FIG. 3C will be described in conjunction with each other.

FIG. 3A is a block diagram that illustrates the normalization of input. At block 302, normalizer 210 determines clusters of item names from the input. In one embodiment of the invention, normalizer 210 may use a statistical technique, such as cluster analysis, that uses qualitative measurements of the item name variants to group the item name variants into clusters of similar item names. In one embodiment of the invention, normalizer 210 may remove punctuation marks, and or extraneous words before applying any cluster analysis. For example, normalizer 210 may remove "Company", "incorporated", and "Inc." from the item names.

At block 304 of FIG. 3A, normalizer 210 determines a normalized item name for each cluster. In one embodiment of the invention, a normalized item name may be determined by determining the shortest prefix from among the item name variants in a given cluster of item name variants. For example, FIG. 3B shows two clusters of item name variants 350 and 355. Associated with clusters of item name variants 350 and 355 are normalized item names 360, 365 respectively. Cluster of item name variants 350 consists of several variants of the brand name "Lands'End". These item name variants are normalized to the normalized item name 360, namely, "Lands End". Similarly, cluster of item names 355 consists of several variants of the brand name "Apple Computer, Inc.". These item name variants are normalized to the normalized item name 365, namely, "Apple Computer".

FIG. 3C shows a cluster of item name variants where each item name variant includes a brand name and a brief description of the item. In FIG. 3C, cluster of item name variants 375 consists of item name variants for a sweater for girls made by Lands' End. The item name variants in cluster 375 are normalized to the normalized item name 380, namely, "Lands End girl's sweater".

Returning to FIG. 3A, after determining the normalized item name for each cluster, at block 306 normalizer 210 maps each item name variant within a cluster to the normalized item name corresponding to the particular cluster. For example, in FIG. 3C, the item name variants in cluster 375, "Land's End sweater for girls", "Landsend Company sweater for girls", "Lands'End, Inc. girl's sweater", and "landsend Incorporated sweater for female children" are mapped to the normalized item name 380, "Lands End girl's sweater".

At block 308, normalizer 210 stores the following information in the dictionary 212:
 1) the item name variants. Examples of item name variants are the item name variants in cluster 375 of FIG. 3C;
 2) the information that is obtained from the item name source and which is associated with the item name variant. Examples of such information would include product information such as sale price, color and size availability; and 3) the mapping information that maps the item name variant to the corresponding normalized item name. An example of mapping information is the mapping of item name variants in cluster 375 to the normalized item name 380, "Lands End girl's sweater".

3. INTERACTIVE MODE

Figure 4A:
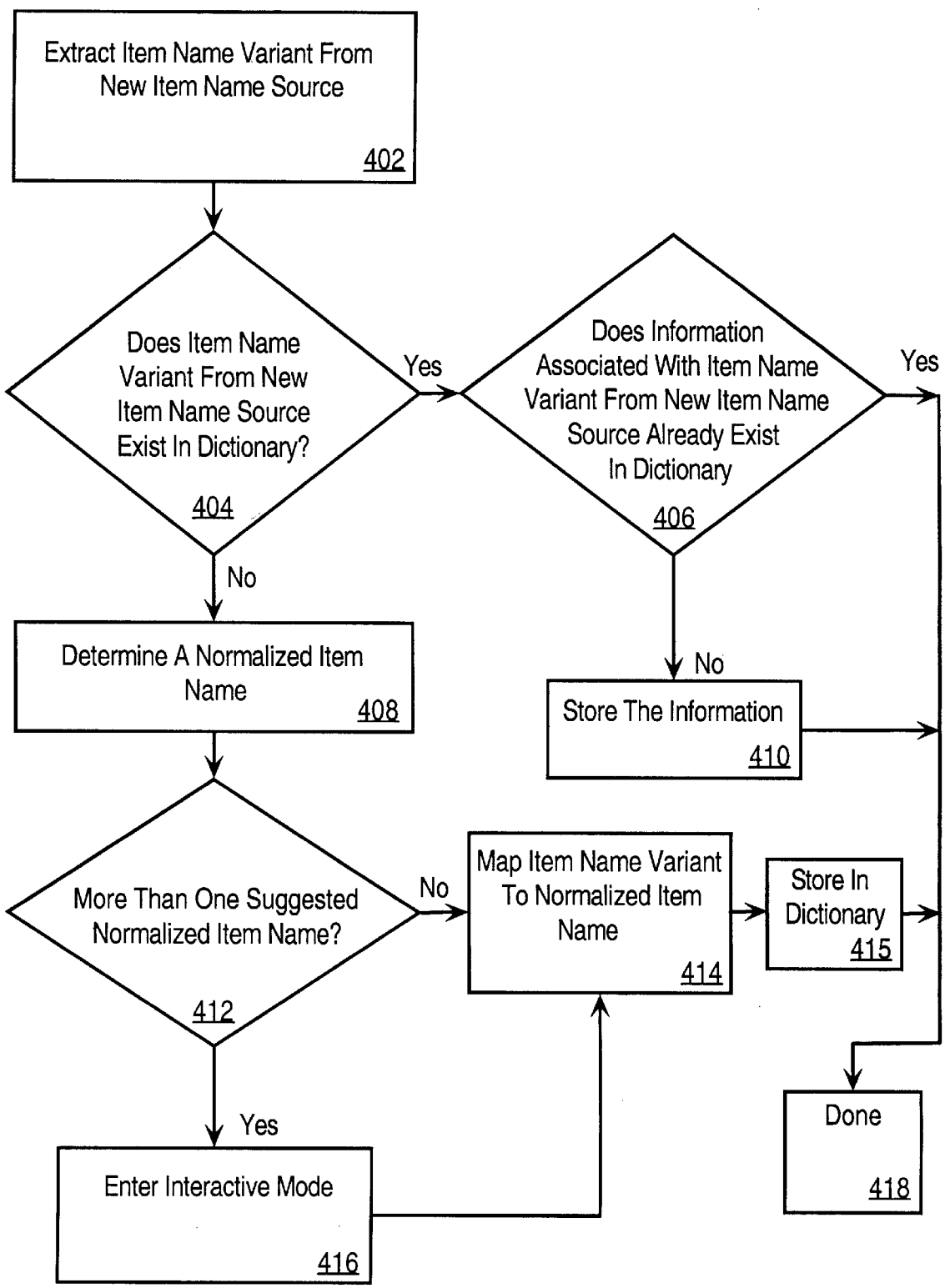
FIG. 4A is a flow diagram that illustrates an approach for normalizing any new variant item name.
Figure 4B:
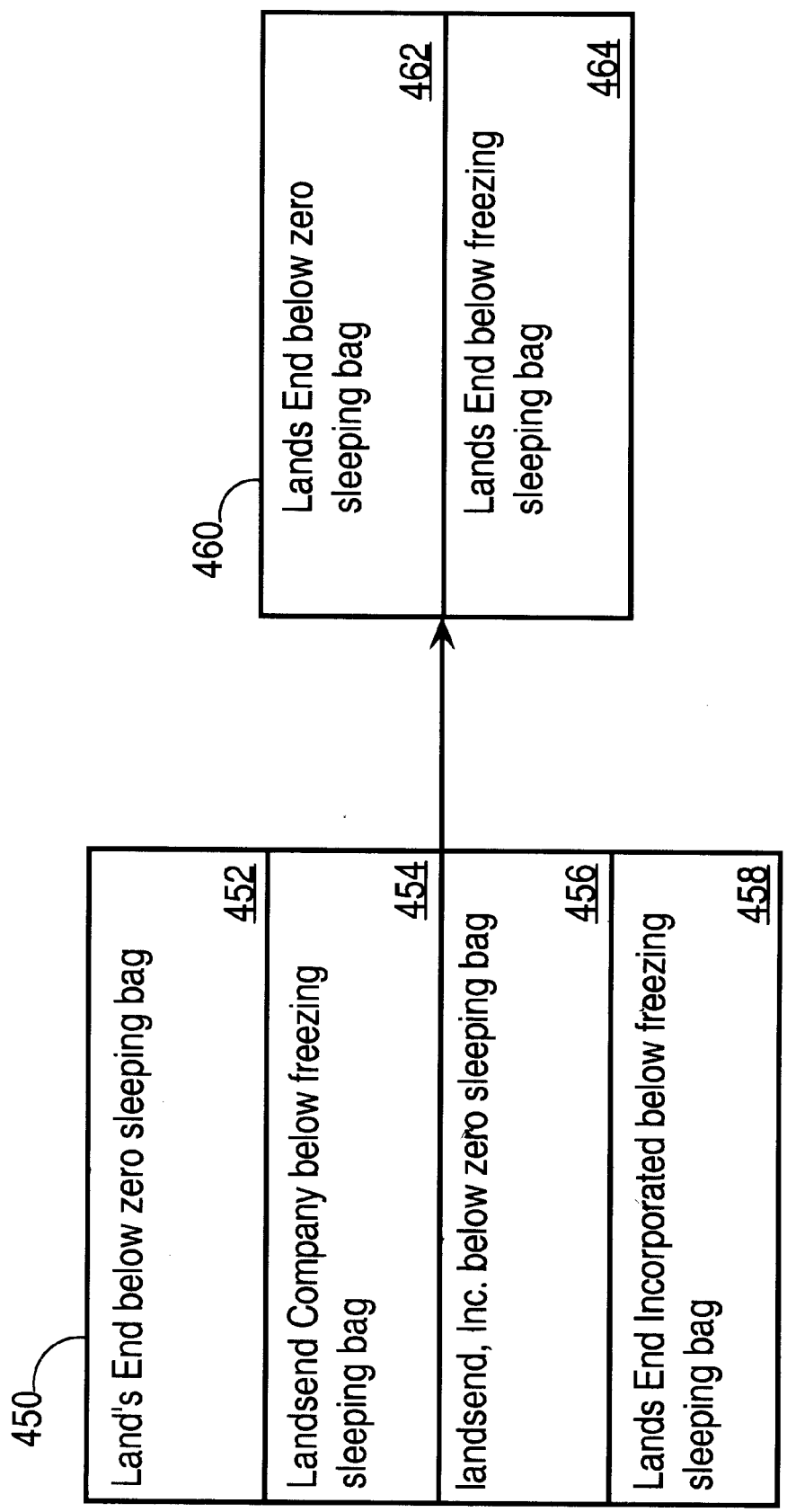
FIG. 4B is a block diagram that shows a set of item name variants and a set of suggested normalized item names.

According to one embodiment of the invention, as new item name sources become available, the mechanism normalizes any new item name variant that is extracted from the records provided by the new item name sources. FIG. 4A and FIG. 4B are described in conjunction with each other. According to one embodiment of the invention, FIG. 4A is a flow diagram that illustrates an approach for normalizing any new variant item name that is extracted from new item name sources.

At block 402, the mechanism extracts an item name variant from a new item name source. At block 404, the mechanism determines whether the item name variant already exists in dictionary 212.

If the mechanism determines that the item name variant already exists in dictionary 212, then at block 406, the mechanism determines whether the information that is associated with the item name variant, and which is from the new item name source, already exists in the dictionary.

If the mechanism determines that the information that is associated with the particular item name variant already exists in the dictionary, then the process is complete at block 418. Otherwise, at block 410, the mechanism stores the information that is associated with the particular item name variant in the dictionary by associating the information with the normalized item name corresponding to the particular item name variant. Thus, if a user submits a search query that specifies any item name variant that is mapped to a particular normalized item name, then all the information associated with the particular normalized item name is retrieved and sent as search results to the user in response to the user's search query.

If at block 404, the mechanism determines that the item name variant does not already exist in dictionary 212, then at block 408 the mechanism determines a normalized item name for the item name variant.

At block 412, the mechanism determines if there is more than one suggested normalized item name for the item name variant. If it is determined that there is only one suggested normalized item name for the item name variant, then at block 414, the mechanism maps the item name variant to the normalized item name.

Next at block 415, the mechanism stores in dictionary 212:

1) the item name variant;
2) the information that is obtained from the item name source and which is associated with the item name variant; and
3) the mapping information that maps the item name variant to the corresponding normalized item name.

After storage in the dictionary, the process is complete at block 418.

If at block 412, it is determined that there is more than one suggested normalized item name for the item name variant, then at block 416, the mechanism enters into an interactive mode. In the interactive mode, according to one embodiment of the invention, a human decision-maker selects one of the suggested normalized item names as the normalized item name for the item name variant.

FIG. 4B is a block diagram that shows a set of item name variants 450, and a set of suggested normalized item names 460. The set of item name variants 450 consists of the following item name variants: "Land's End below zero sleeping bag" 452, "Landsend Company below freezing sleeping bag" 454, "landsend, Inc. below zero sleeping bag" 456, and "Lands End Incorporated below freezing sleeping bag" 458. Assume that the mechanism determined there were 2 suggested normalized item names. Thus, the set of suggested normalized item names 460 consists of: "Lands End below zero sleeping bag" 462, and "Lands End below freezing sleeping bag" 464. It is left to the judgment of human decision maker to select either "Lands End below zero sleeping bag": 462, or "Lands End below freezing sleeping bag" 464 as the normalized item name for the set of item name variants 450.

For illustrative purposes, assume that the human decision maker selects "Lands End below freezing sleeping bag" 464 as the normalized item name for the set of item name variants 450. Control then passes to blocks 414, 415 and finally to 418 of FIG. 4A as described above.

4. IMPLEMENTATION MECHANISMS

The invention may be implemented in hardware circuitry, in computer software, or a combination of hardware circuitry and computer software and is not limited to a particular hardware or software implementation.

Figure 5:
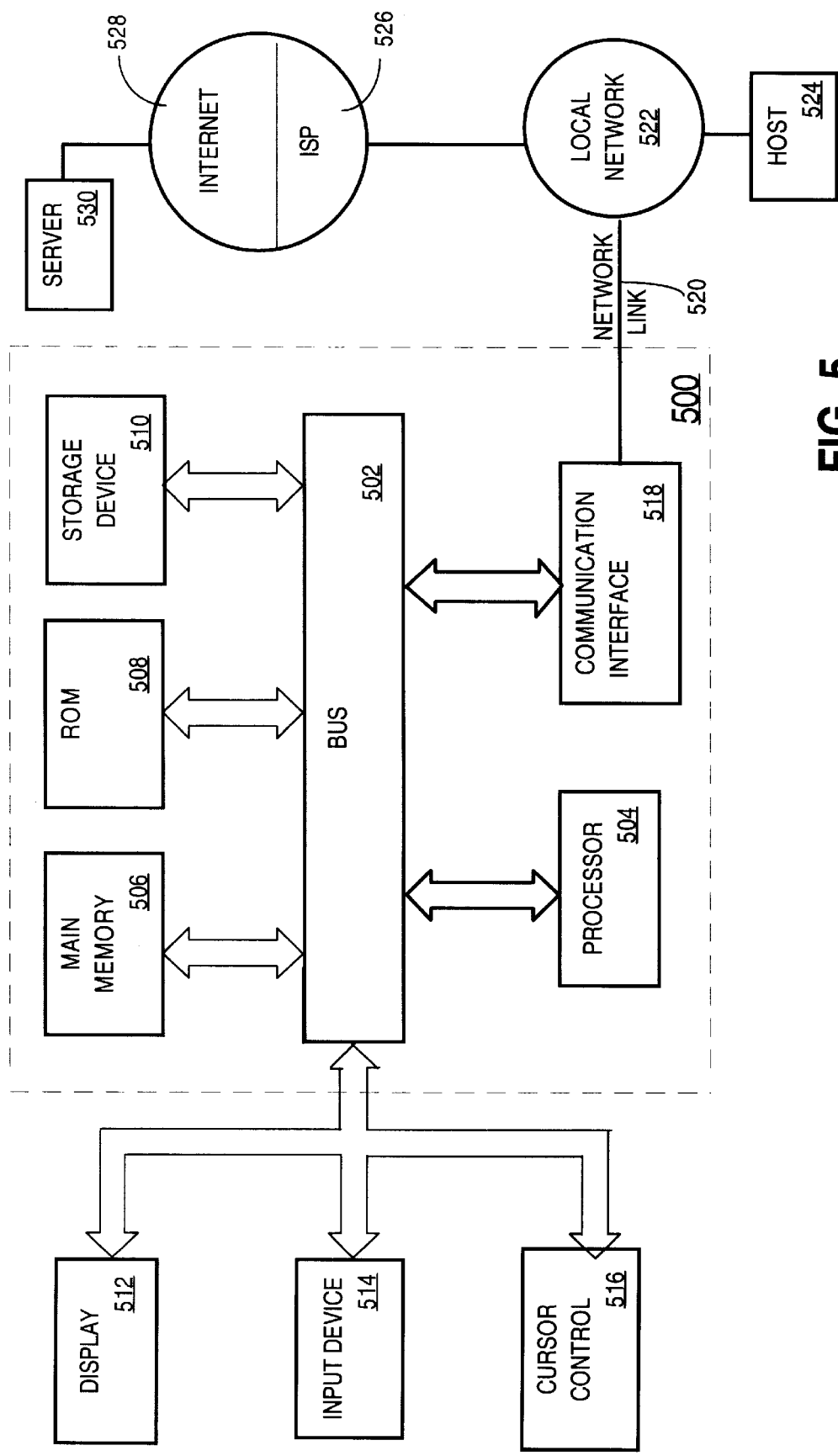
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for processing search queries. According to one embodiment of the invention, the processing of search queries is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for the processing of search queries as described herein. The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. However, various modifications and changes may be made thereto without departing from the broader spirit and scope of the invention. The specification and drawings are, accordingly, to be regarded in an illustrative sense rather than a restrictive sense.

What is claimed is:

1. A method for normalizing item names, the method comprising the computer-implemented steps of:

determining one or more clusters of item name variants, wherein the item name variants are extracted from an initial set of records and wherein each cluster is a cluster of similar item name variants;

determining a normalized item name that is logically associated with each cluster;

mapping the item name variants in each cluster to the normalized item name that is logically associated with the cluster to create an initial set of mapping information; and creating a dictionary that stores at least the initial set of mapping information.

2. The method as recited in claim 1, further comprising the steps of:

determining whether a new item name variant can be mapped to any normalized name in the dictionary, wherein the new item name variant is extracted from a set of records that is distinct from the initial set of records; and creating one or more suggested normalized item names when the new item name variant cannot be mapped to any normalized item name in the dictionary.

3. The method as recited in claim 2, wherein the step of creating one or more suggested normalized item names is performed by creating a plurality of suggested normalized item names, the method further comprising the steps of:

receiving user input that selects one of the plurality of suggested normalized item names as the normalized item name associated with the new item name variant;

mapping the new item name variant to the normalized item name associated with the new item name variant to create a new set of mapping information; and adding the new set of mapping information to the dictionary.

4. The method as recited in claim 2, wherein the step of creating one or more suggested normalized item names is performed by creating one suggested normalized item name, the method further comprising the steps of:

using the suggested normalized item name as the normalized item name associated with the new item name variant;

mapping the new item name variant to the normalized item name associated with the new item name variant to create a new set of mapping information; and adding the new set of mapping information to the dictionary.

5. The method as recited in claim 1, wherein the step of determining one or more clusters of item name variants includes grouping the item name variants into clusters of similar item name variants on a basis of qualitative measurements of the item name variants.

6. The method as recited in claim 1, wherein the step of determining a normalized item name that is logically associated with each cluster further comprises the steps of:

ignoring punctuation, case-sensitivity and extraneous words from the item name variants; and determining a shortest common prefix from among the item name variants within each cluster.

7. The method as recited in claim 1, wherein the step of creating the dictionary further comprises storing at least one of the one or more clusters of item name variants and information that is obtained from an item name source that is associated with each of the item name variants within the one or more clusters.

8. A computer-readable medium for normalizing item names, the computer-readable medium carrying one or more sequences of one or more instructions which, when executed by one or more processors, cause the one or more processors to perform the steps of:

determining one or more clusters of item name variants, wherein the item name variants are extracted from an initial set of records and wherein each cluster is a cluster of similar item name variants;

determining a normalized item name that is logically associated with each cluster;

mapping the item name variants in each cluster to the normalized item name that is logically associated with the cluster to create an initial set of mapping information; and creating a dictionary that stores at least the initial set of mapping information.

9. The computer-readable medium as recited in claim 8, further comprising the steps of:

determining whether a new item name variant can be mapped to any normalized name in the dictionary, wherein the new item name variant is extracted from a set of records that is distinct from the initial set of records; and creating one or more suggested normalized item names when the new item name variant cannot be mapped to any normalized item name in the dictionary.

10. The computer-readable medium as recited in claim 9, wherein the step of creating one or more suggested normalized item names is performed by creating a plurality of suggested normalized item names, the method further comprising the steps of:

receiving user input that selects one of the plurality of suggested normalized item names as the normalized item name associated with the new item name variant;

mapping the new item name variant to the normalized item name associated with the new item name variant to create a new set of mapping information; and adding the new set of mapping information to the dictionary.

11. The computer-readable medium as recited in claim 9, wherein the step of creating one or more suggested normalized item names is performed by creating one suggested normalized item name, the method further comprising the steps of:

using the suggested normalized item name as the normalized item name associated with the new item name variant;

mapping the new item name variant to the normalized item name associated with the new item name variant to create a new set of mapping information; and adding the new set of mapping information to the dictionary.

12. The computer-readable medium as recited in claim 8, wherein the step of determining one or more clusters of item name variants includes grouping the item name variants into clusters of similar item name variants on a basis of qualitative measurements of the item name variants.

13. The computer-readable medium as recited in claim 8, wherein the step of determining a normalized item name that is logically associated with each cluster further comprises the steps of:

ignoring punctuation, case-sensitivity and extraneous words from the item name variants; and determining a shortest common prefix from among the item name variants within 14. The computer-readable medium as recited in claim 7, wherein the step of creating the dictionary further comprises storing at least one of the one or more clusters of item name variants and information that is obtained from an item name source that associated with each of the item name variants within the one or more clusters.

15. An apparatus comprising a query processing mechanism for normalizing item names, the query processing mechanism being configured to:

determining one or more clusters of item name variants, wherein the item name variants are extracted from an initial set of records and wherein each cluster is a cluster of similar item name variants;

determining a normalized item name that is logically associated with each cluster;

mapping the item name variants in each cluster to the normalized item name that is logically associated with the cluster to create an initial set of mapping information; and creating a dictionary that stores at least the initial set of mapping information each cluster.

16. The apparatus as recited in claim 15, further comprising the steps of:

determining whether a new item name variant can be mapped to any normalized name in the dictionary, wherein the new item name variant is extracted from a set of records that is distinct from the initial set of records; and creating one or more suggested normalized item names when the new item name variant cannot be mapped to any normalized item name in the dictionary.

17. The apparatus as recited in claim 16, wherein the step of creating one or more suggested normalized item names is performed by creating a plurality of suggested normalized item names, the method further comprising the steps of receiving user input that selects one of the plurality of suggested normalized item names as the normalized item name associated with the new item name variant;

mapping the new item name variant to the normalized item name associated with the new item name variant to create a new set of mapping information; and adding the new set of mapping information to the dictionary.

18. The apparatus as recited in claim 16, wherein the step of creating one or more suggested normalized item names is performed by creating one suggested normalized item name, the method further comprising the steps of:

using the suggested normalized item name as the normalized item name associated with the new item name variant;

mapping the new item name variant to the normalized item name associated with the new item name variant to create a new set of mapping information; and adding the new set of mapping information to the dictionary.

19. The apparatus as recited in claim 15, wherein the step of determining one or more clusters of item name variants includes grouping the item name variants into clusters of similar item name variants on a basis of qualitative measurements of the item name variants.

20. The apparatus as recited in claim 15, wherein the step of determining a normalized item name that is logically associated with each cluster further comprises the steps of:

ignoring punctuation, case-sensitivity and extraneous words from the item name variants; and determining a shortest common prefix from among the item name variants within each cluster.

\* \* \* \* \*